US006198567B1

United States Patent
Bergmann

(10) Patent No.: US 6,198,567 B1
(45) Date of Patent: Mar. 6, 2001

(54) FARADAY ROTATION VARIABLE ATTENUATOR

(75) Inventor: Ernest Eisenhardt Bergmann, Fountain Hill Borough, Lehigh County, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/186,840

(22) Filed: Nov. 5, 1998

(51) Int. Cl.[7] ........................................ G02F 1/09
(52) U.S. Cl. ........................ 359/281; 359/283; 359/324; 359/484; 385/6
(58) Field of Search ................................. 359/280, 281, 359/283, 238, 240, 256, 282, 484, 495, 324; 385/4, 6

(56) References Cited

U.S. PATENT DOCUMENTS

| | | | |
|---|---|---|---|
| 4,989,938 | * | 2/1991 | Tamulevich ....................... 350/96.15 |
| 5,402,509 | * | 3/1995 | Fukushima ............................. 385/33 |
| 5,471,340 | * | 11/1995 | Cheng et al. ......................... 359/281 |
| 5,477,376 | * | 12/1995 | Iwatsuka et al. ..................... 359/283 |
| 5,619,367 | * | 4/1997 | Iwatsuka et al. ..................... 359/283 |
| 5,844,710 | * | 12/1998 | Fukushima ........................... 359/283 |
| 5,867,300 | * | 2/1999 | Onaka et al. ........................ 359/283 |
| 5,889,609 | * | 3/1999 | Fukushima .......................... 359/280 |
| 5,915,063 | * | 6/1999 | Colbourne et al. .................. 385/140 |

OTHER PUBLICATIONS

N. Fukushima "OSA Trends in Optics and Photonics" vol. 5, pp. 249–252, 1996.
JDS Fitel "VCB Series—Voltage Controlled Attenuators" 1998.
Dicon "Product Summary '96–'97—Switches".

\* cited by examiner

*Primary Examiner*—Loha Ben
(74) *Attorney, Agent, or Firm*—Wendy W. Koba

(57) ABSTRACT

A variable optical attenuator comprises a Faraday rotator including a ferromagnetic garnet film disposed input/output single mode optical signal paths. A collimating/lensing arrangement is used to focus the optical signal between the input/output signal paths and the ferromagnetic garnet film. The ferromagnetic material exhibits multiple types of magnetic domain such that an optical signal will experience ±rotation as its passes through the film. A 90° garnet film thus provides ±90° rotation, resulting in a fill 180° directional difference between the optical signal components. The amplitudes of these signals will thus cancel, providing an essential "full" attenuation of the optical signal. The application and adjustment of a magnetic field to the garnet film controls the strength (i.e., size and area) of each type of magnetic domain within the ferromagnetic material so as to control the amount of optical signal cancellation and, therefore, the degree of attenuation at the output of the arrangement.

24 Claims, 2 Drawing Sheets

10

30

50

60

70

FARADAY ROTATION VARIABLE ATTENUATOR

BACKGROUND OF THE INVENTION

The present invention relates to a Faraday rotation attenuator and, more particularly, to the use of multiple domain garnet, disposed between single mode transmission paths, to form an attenuator of variable strength by varying the external magnetic field applied to the ferromagnetic garnet.

Optical attenuators are useful in a number of different optical system applications. For example, attenuators are used in optical amplifier systems to "balance" the gain across the different operating wavelengths. An optical attenuator may also be inserted in the signal path of an amplifier system beyond the pre-amplifier location to stabilize the saturation level of the power amplifier Wavelength division multiplexed systems may also use optical attenuators in the receiver portion of the system to compensate for variations in received signal power Most conventional prior art attenuators include a motorized arrangement, using a stepper motor to rotate one or more objects into and out of the optical signal path. Although such arrangements are adjustable and can provide the desired degree of attenuation, they are relatively slow and have reliability concerns related to the need to physically move the objects with respect to the signal path. A non-mechanical optical attenuator is described in the article entitled "Non-Mechanical Variable Attenuator Module using Faraday Effect", by N. Fukushima et al. appearing in *OSA Trends in Optics and Photonics*, 1996, Vol. 5, at pp. 249–52. In this arrangement, a variable Faraday rotator is disposed between a pair of polarizers. Two magnets are disposed to surround the magneto-optic crystal material in the rotator, a permanent magnet and an electromagnet. The permanent magnet thus defines a certain domain within the material and the polarizers control the polarization state of the input and output signals. The application of a current to the electromagnet is then used to control the degree of attenuation and has been found to provide attenuation in the range of 1.6 to 25 dB.

While the Fukishima et al. arrangement may be considered an advance over the mechanical attenuators, the arrangement is rather bulky, requiring the use of a pair of magnets, as well as the polarizers to control the state of the signals passing through the attenuator.

Thus, a need remains in the art for providing adjustable optical attenuator without the need to physically move system components to achieve the attenuation and which is less bulky than the prior art non-mechanical alternatives.

SUMMARY OF THE INVENTION

The need remaining in the prior art is addressed by the present invention, which relates to a Faraday rotation attenuator and, more particularly, to the use of multiple domain garnet, disposed between single mode transmission paths, to form an attenuator of variable strength by varying the external magnetic field applied to the ferromagnetic garnet.

The adjustable attenuator of the present invention functions to provide transmission of an optical signal from a first (input) single mode optical fiber to a second (output) single mode optical fiber, while providing any "variable" amount of optical attenuation therebetween, that is, provide fiber-to-fiber coupling loss in the range from 1 dB (little attenuation) to greater than 50 dB (significant attenuation). By varying the strength of the magnetic field surrounding the garnet film, the attenuation may be adjusted between these two extremes.

In accordance with one embodiment of the present invention, a variable attenuator comprises an input signal mode fiber, a first focusing/collimating element (such as a GRIN lens, aspheric lens, or the like) for collimating the single mode signal exiting the input fiber, a 90° Faraday rotator comprising a section of garnet material, a second collimating/focusing element disposed beyond the Faraday rotator, and a single mode output fiber for collecting the focused signal exiting the second collimating/focusing element. The garnet is "ferromagnetic", meaning that in the absence of an applied magnetic field, the garnet exhibits alternating magnetic domains at a microscopic level. That is, the two magnetic domains are balanced such that equal portions of the optical signal passing through will be rotated through each polarization. If the garnet film is of a sufficient thickness to provide a 90° rotation, the two signals associated with the two types of magnetic domain will exit 180° out of the direction of polarization such that their amplitudes will essentially cancel at the output fiber, yielding a large degree of attenuation. The application of a magnetic field results in spreading one magnetic domain type, while causing the other domain type to shrink. Therefore, the portion of the optical signal associated with the latter domain will be diminished and little or no cancellation of the signal associated with the stronger domain will occur, allowing this signal to pass relatively unaffected into the output fiber (that is, little attenuation will occur).

In an alternative embodiment, a 45° Faraday rotator may be used, with a reflector disposed in the signal path beyond the 45° Faraday rotator. In this case, the optical signal will pass through the rotator twice (hence, each beam component will experience a fall 90° rotation) as in the embodiment described above. Again, when no magnetic field is present, the two magnetic domains are equally present, one rotating the plane of linear polarization +45°, and the other rotating the plane of linear polarization −45°. The application of a magnetic field will alter the balance of these two rotations, where a field of sufficient strength will completely suppress one of the domain types. In a reflective arrangement, the return signal may be coupled to a separate output single mode fiber disposed next to the input single mode fiber. Alternatively, the return signal may be coupled back into the input single mode fiber.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
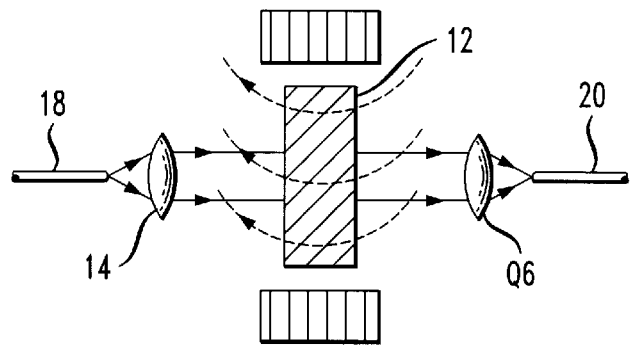
FIG. 1 illustrates an exemplary variable attenuator using a 90° Faraday rotator formed in accordance with the present invention.

An optical attenuator 10 of the present invention is illustrated in FIG. 1. Attenuator 10 includes a transparent garnet film 12 disposed between an input collimating element 14 and an output focusing element 16, where elements 14 and 16 may comprise a GRIN lens, aspheric lens or any other appropriate lensing arrangement. The optical signal is applied as an input to attenuator 10 via an input single mode fiber 18. Similarly, the focused output beam from output focusing element 16 is coupled into a single mode output fiber 20. Although referred to throughout this discussion as "optical fibers" it is to be understood that the input/output signal paths may comprise any suitable single mode signal path, such as optical fibers, planar waveguides, and the like. In accordance with the present invention, garnet film 12 must be "ferromagnetic" such that in the absence of an applied magnetic field, film 12 exhibits alternating magnetic domain types at a microscopic level. Therefore, approximately half of the collimated expanded beam exiting input collimating element 14 will experience one domain type as it passes through garnet film 12 and the remaining half of the optical signal will experience the opposite magnetic domain type. For the exemplary arrangement shown in FIG. 1, garnet film 12 is chosen to have a predetermined thickness t such that the optical beam will be rotated 90° as it passes through the film. If the input signal is linearly polarized, a first linear component will follow the first magnetic domain type and be rotated, for example, +90°. The other linear component, following the opposite magnetic domain type, will be rotated −90°. As they exit garnet film 12, both components are still linearly polarized, but will now be out of direction with one another by 180°. Therefore, when these components are recombined as they pass through focusing output element 16, the net amplitude will be cancelled to essentially zero, resulting in a high degree of attenuation. It is to be understood that the use of a garnet film thick enough to provide a 90° rotation is exemplary only. That is, a garnet film providing a rotation of, for example, 80° will yield two linear components differing in direction by 160°. These components will, therefore, largely cancel and attenuation is achieved. In general, any appropriate thickness of garnet material may be used, where the degree of attenuation will be related to the amount of rotation imparted by the material.

In accordance with the present invention, the attenuation experienced by the optical signal may be adjusted by applying an external magnetic field to the ferromagnetic garnet material. The application of an external magnetic field causes one type of the magnetic domains to "spread" and the other type to "shrink". Therefore, the optical beam component associated with the "shrinking" domain will be diminished, and the remaining optical beam component associated with the spreading domain will be increased, allowing the remaining beam component to pass through with little cancellation from the diminishing beam. In the limit, the application of a sufficiently strong magnetic field will result in completely suppressing one of the magnetic domain types. In this case, the optical beam component associated with the remaining, strong magnetic domain type will pass through attenuator 10 essentially unimpeded (i.e., little attenuation). Therefore, by varying the applied magnetic field, the strength of the optical components can be controlled to control the degree of attenuation present in the output signal. In application, attenuation in the range of less than 1 dB (for example, as low as 0.4 db) to greater than 30 dB can be achieved with the arrangement of the present invention.

Figure 2:
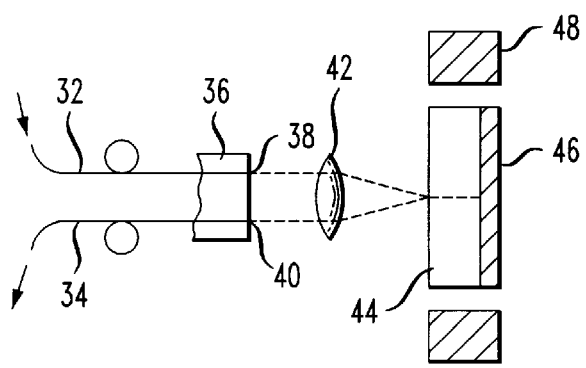
FIG. 2 is an alternative embodiment of the present invention, using a 45° Faraday rotator/reflector, with the input and output single mode fibers disposed in a coplanar relationship.

FIG. 2 illustrates an alternative variable attenuator 30 formed in accordance with the present invention, where this embodiment is reflective in design. As shown, the optical signal coupling into attenuator 30 is provided by a pair of single mode optical fibers 32 and 34. In this particular embodiment, fibers 32 and 34 are held within a common fixture 36 so that their respective endfaces 38 and 40 remain coplanar. A focusing/collimating element 42 is disposed in the optical signal path beyond fixture 36 and a 45° Faraday rotator 44 is positioned beyond focusing/collimating element 42. Element 42 may comprise, for example, a GRIN lens, an aspheric lens, or any other appropriate element. In the arrangement of attenuator 30, a reflective surface 46 is formed on the rear surface of 45° Faraday rotator 44.

In operation, an optical signal exiting endface 38 of single mode fiber 32 will pass through focusing/collimating element 42 and exit element 42 as a collated beam. The signal next passes through 45° Faraday rotator 44 and reflects off of surface 46 to be re-directed through rotator 44, element 42 and ultimately coupled into endface 40 of single mode fiber 34. The reflective nature of this arrangement allows a 45° garnet film to be used in place of the 90° of FIG. 1, where 45° garnet is easier to obtain for the typical application wavelength of 1.55 um. That is, garnet film 44 may comprise a thickness t' that is essentially half that required for garnet film 12 of the arrangement FIG. 1. The reduction in thickness thus results in compacting the physical size of the adjustable attenuator.

In accordance with the present invention, the application of a magnetic field to the garnet material of Faraday rotator 44 is used to control the amount of output signal coupled into single mode fiber 34. In particular, when little or no magnetic field is applied to rotator 44, the two types of magnetic domain present in the garnet material are of equal strength; one type of magnetic domain rotates the plane of linear polarization by +45° and the other type rotates the plane of linear polarization by −45°. Therefore, when the optical signal passes through the garnet on the first pass (that is, at the signal exits as a collimated beam from element 42), the linearly polarized signal will be equally rotated both +45° and −45°. After reflection off of surface 46, the signal will pass through rotator 44 a second time and therefore be rotated an additional (and again equal) +45°. The total rotation of +90° is balanced and, therefore, the signals will be out of polarization direction by 180°. This directional difference results in cancelling the amplitude of the pair of optical signals at the output such that there will be essentially no signal coupled into output single mode optical fiber 34. In this mode (i.e., no applied magnetic field), attenuator 30 functions as an open switch.

With the application of a magnetic field to Faraday rotator 44 (represented by the cross section of a magnetic device 48 surrounding the garnet film of Faraday rotator 44), the balance of these two types of magnetic domain will be perturbed. Therefore, one rotation will be favored with respect to the other and incomplete cancellation of the optical signal will result. The incomplete cancellation results in a return optical signal propagating through focusing/collimating element 42 and thereafter being coupled into output single mode fiber 34. When the magnetic field is sufficiently strong, one of the two types of magnetic domain within the garnet film of rotator 44 will be completely suppressed. In this case, the optical signal present along the remaining type of magnetic domain will be essentially unaffected and will be completely coupled into output single mode fiber 34. In this mode (i.e., maximum applied magnetic field), attenuator 30 functions to provide a maximum output signal (i.e., minimal attenuation).

In summary, therefore, the application of a magnetic field 48 to Faraday rotator 44, as well as the control of the strength of the applied magnetic field, functions to control the amount of optical output signal provided by attenuator 30, where a "variable" degree of an optical output signal coupling is provided by adjusting the strength of the applied magnetic field in the range between "maximum" magnetic field and "no" magnetic field.

Figure 3:
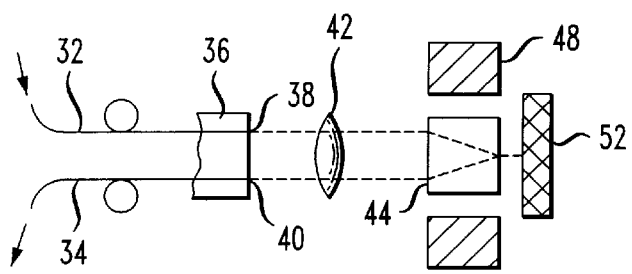
FIG. 3 illustrates an alternative embodiment of the arrangement of FIG. 2, utilizing a separate mirror element as the terminating reflective surface.

An alternative variable attenuator 50 formed in accordance with the present invention is illustrated in FIG. 3. In this embodiment, a separate mirror 52 is used in place of a reflective surface 46 on Faraday rotator 44 (see FIG. 2). Advantageously, by using a separate reflective element, mirror 52 may be oversized with respect to Faraday rotator 44. As such, mirror 52 may be more stable, and less subject to movement, vibration, etc. when compared with the use of a reflective surface, such as surface 46 shown in FIG. 1. In many circumstances, aging, movement, packaging, etc. may affect the location and movement of Faraday rotator 44. Thus, when using a reflective surface directly formed on the Faraday rotator (such as the embodiment of FIG. 2), there is the potential for optical misalignment between the image of fiber 32 and fiber 34. By using a separate mirror element, therefore, any slight tilting or vibration of Faraday rotator 44 will not greatly affect the optical alignment between the image of input fiber 32 and output fiber 34.

Figure 4:
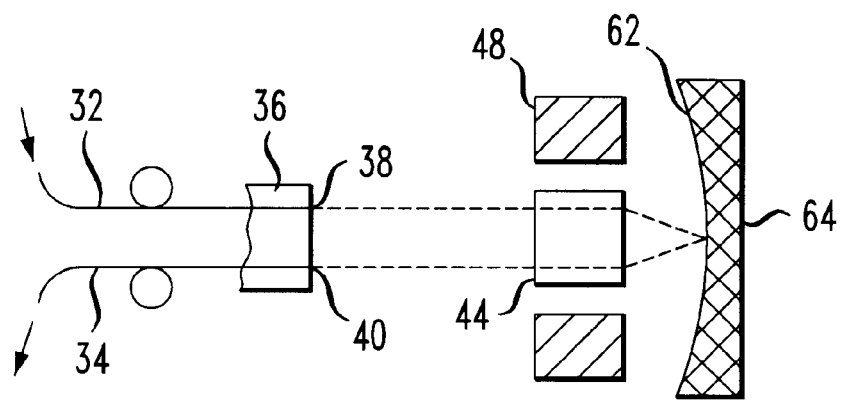
FIG. 4 illustrates yet another embodiment of the arrangement of FIG. 2, incorporating the focusing/collimating function into the reflective element.

FIG. 4 illustrates an alternative variable attenuator 60 of the present invention, where the need for a separate focusing/collimating element is eliminated by incorporating a focusing/collimating surface 62 on a separate mirror element 64. Although exact collimation into a linear beam is not possible with this arrangement, the Faraday rotation experienced by the beam as it passes through the garnet will be sufficient to provide the desired attenuation/isolation characteristics.

Figure 5:
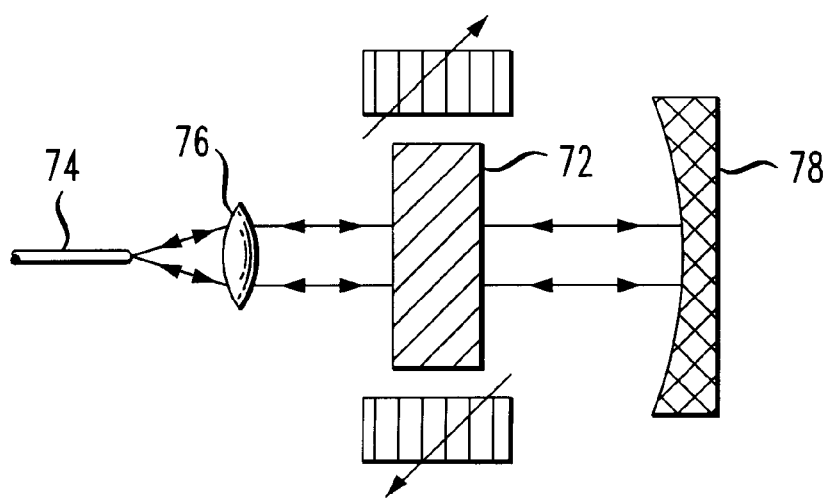
FIG. 5 illustrates an alternative embodiment of the present invention where the return signal is coupled back into the input fiber.

FIG. 5 illustrates a variable attenuator 70 including a 45° Faraday garnet film 72, where an external magnetic field is used to control the two types of magnetic domain present in the film. In this arrangement, only one single mode fiber 74 is used, in conjunction with a focusing/collimating element 76. A reflector 78 is disposed on the opposite side of garnet film 72 and functions to re-direct the reflected signal through film 72 and element 76 so as to couple the optical signal back into fiber 74. It is to be understood that various other "reflecting" arrangements may be used, such as a separate mirror element discussed above in the other embodiments. As with the arrangements described above, the amount of light coupled from the input to the output (in this case, back into single mode fiber 74) depends upon the lack of complete interference of amplitudes from the light passing through the two types of magnetic domains within garnet film 72. In general, when no external magnetic field is applied, the two types of domain will have similar cross-sectional areas. Therefore, the double-pass through garnet film 72 will result in the light signals being 180° out of direction of polarization and, therefore, will essentially cancel one another. When an external magnetic field is applied, one type of domain will dominate in film 72, resulting in decreasing the amount of cancellation (that is, decreasing the attenuation) present in the output signal.

Other and further arrangements of the present invention are possible and all such variations are considered to fall within the spirit and scope of the present invention. For example, the pair of single mode fibers may be disposed in an arrangement other than the singular fixture of the illustrated embodiments. Various means for applying the magnetic field to the garnet film within the Faraday rotator are possible. In general, the variable attenuator of the present invention is limited only by the claims appended hereto.

What is claimed is:

1. A variable optical attenuator comprising:
    a Faraday rotator comprising a ferromagnetic garnet film of a predetermined thickness t, said ferromagnetic film simultaneously exhibiting a first type of magnetic domain for rotating the plane of polarization for an optical signal passing therethrough in a first direction by a predetermined amount related to said garnet film thickness and a second type of magnetic domain for rotating the plane of polarization in a second, opposite direction the predetermined amount;
    an input single mode optical signal path;
    an output single mode optical signal path;
    a focusing/lensing arrangement disposed between the optical signal paths and said Faraday rotator for coupling an applied optical signal between said signal paths and said Faraday rotator; and
    an adjustable external magnetic field coupled to said Faraday rotator for controlling the presence of said first and second magnetic domains in said Faraday rotator such that the first and second magnetic domains may be either one of balanced and unbalanced and thereby control the degree of optical coupling between said input optical signal path and said output optical signal path.

2. A variable optical attenuator as defined in claim 1 wherein the Faraday garnet film comprises a thickness t sufficient to provide a 90° rotation to an optical signal passing therethrough, the first type of magnetic domain providing a rotation of +90° and the second type of magnetic domain providing a rotation of −90°.

3. A variable optical attenuator as defined in claim 1 wherein the focusing/lensing arrangement comprises a collimating element disposed between the input single mode signal path and the Faraday rotator and a focusing element disposed between said Faraday rotator and the output single mode signal path.

4. A variable optical attenuator as defined in claim 3 wherein each element of the focusing/lensing arrangement comprises a GRIN lens.

5. A variable optical attenuator as defined in claim 3 wherein each element of the focusing/lensing arrangement comprises an aspheric lens.

6. A variable optical attenuator as defined in claim 1 wherein the input signal path comprises a single mode optical fiber.

7. A variable optical attenuator as defined in claim 1 wherein the output signal path comprises a single mode optical fiber.

8. A variable optical attenuator as defined in claim 1 wherein the input and output signal paths comprise single mode optical fibers.

9. A variable optical attenuator comprising:
    a Faraday rotator comprising a garnet film simultaneously exhibiting a first type of magnetic domain for rotating the plane of optical linear polarization approximately +45° and a second type of magnetic domain for rotating the plane of optical linear polarization approximately −45°;
    a pair of single mode optical signal paths disposed in a contiguous relationship such that a first endface of a first, input optical signal path of said pair of signal paths is coplanar with a first endface of a second, output optical signal path of said pair of optical signal paths, said pair of single mode optical signal paths located on a first side of said Faraday rotator;

a reflective element disposed on the opposite side of said Faraday rotator for redirecting an optical signal exiting the input optical signal path through said Faraday rotator for a second pass;

a focusing/collimating element disposed to provide collimation of an optical signal exiting the input optical signal path and focusing of an optical signal entering the output optical signal path; and a variable magnetic field for varying the presence of said first and second types of magnetic domain within the garnet film of said Faraday rotator such that a variable amount of an optical output signal will exit from said output optical signal path, the magnetic field variable such that the first and second types of magnetic domain may be either one of balanced and unbalanced and thereby control the degree optical coupling between said input optical signal path and said output optical signal path.

10. A variable attenuator as defined in claim 9 wherein the focusing/collimating element is disposed between the pair of single mode optical signal paths and the Faraday rotator.

11. A variable attenuator as defined in claim 10 wherein the focusing/collimating element comprises a GRIN lens.

12. A variable attenuator as defined in claim 10 wherein the focusing/collimating element comprises an aspheric lens.

13. A variable attenuator as defined in claim 9 wherein the reflective surface comprises a reflective film disposed on the endface of the garnet film of the Faraday rotator.

14. A variable attenuator as defined in claim 9 wherein the reflective surface comprises a separate mirror element disposed beyond the output of the Faraday rotator.

15. A variable attenuator as defined in claim 14 wherein the focusing element is formed as a curved front surface of the separate mirror element.

16. A variable attenuator as defined in claim 9 wherein the input single mode signal path comprises a single mode optical fiber.

17. A variable attenuator as defined in claim 9 wherein the output single mode signal path comprises a single mode optical fiber.

18. A variable attenuator as defined in claim 9 wherein the input and output single mode signal paths comprise single mode optical fibers.

19. A variable optical attenuator comprising:

a Faraday rotator comprising a garnet film simultaneously exhibiting a first type of magnetic domain for rotating the plane of optical linear polarization approximately +45° and a second type of magnetic domain for rotating the plane of optical linear polarization approximately −45°;

a single mode optical signal path located on a first side of said Faraday rotator;

a reflective element disposed on the opposite side of said Faraday rotator for redirecting an optical signal exiting the optical signal path through said Faraday rotator for a second pass;

a focusing/collimating element disposed to provide collimation of an optical signal exiting the input optical signal path and focusing of an optical signal entering the optical signal path; and a variable magnetic field for varying the presence of said first and second types of magnetic domain within the garnet film of said Faraday rotator such that a variable amount of an optical output signal will exit from said optical signal path, the magnetic field variable such that the first and second types of magnetic domain may be either one of balanced and unbalanced and thereby control the degree attenuation present in the output optical signal.

20. A variable attenuator as defined in claim 19 wherein the focusing/collimating element comprises an aspheric lens.

21. A variable optical attenuator comprising:

a Faraday rotator comprising a garnet film simultaneously exhibiting a first magnetic domain for rotating the plane of optical linear polarization +45° and a second magnetic domain for rotating the plane of optical linear polarization −45°;

a single mode optical signal path located on a first side of said Faraday rotator;

a reflective element disposed on a second, opposite side of said Faraday rotator for redirecting an optical signal exiting the single mode signal path through said Faraday rotator for a second pass;

a focusing/collimating element disposed to provide collimation of an optical signal exiting the single mode optical fiber and focusing of an optical signal entering the single mode optical fiber; and a variable magnetic field for varying the presence of said first and second magnetic domains within the garnet film of said Faraday rotator such that a variable amount of an optical output signal will exit from said output optical fiber, the magnetic field variable such that the first and second magnetic domains may be either one of balanced and unbalanced and thereby control the degree optical coupling into the single mode optical fiber.

22. A variable attenuator as defined in claim 21 wherein the single mode optical signal path comprises a single mode optical fiber.

23. A variable attenuator as defined in claim 21 wherein the focusing/collimating element comprises a GRIN lens.

24. A variable attenuator as defined in claim 21 wherein the single mode optical path comprises a planar waveguide.

* * * * *